(12) United States Patent
Michaels

(10) Patent No.: US 7,995,749 B2
(45) Date of Patent: Aug. 9, 2011

(54) CRYPTOGRAPHIC SYSTEM CONFIGURED FOR EXTENDING A REPETITION PERIOD OF A RANDOM SEQUENCE

(75) Inventor: Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 882 days.

(21) Appl. No.: 11/928,013

(22) Filed: Oct. 30, 2007

(65) Prior Publication Data

US 2009/0110197 A1 Apr. 30, 2009

(51) Int. Cl.
*H04K 1/00* (2006.01)
*H04L 9/00* (2006.01)
*H04L 9/28* (2006.01)

(52) U.S. Cl. .......................... 380/28; 380/268
(58) Field of Classification Search .............. 380/28, 380/268
See application file for complete search history.

(56) References Cited

U.S. PATENT DOCUMENTS

| | | | |
|---|---|---|---|
| 3,564,223 A | 2/1971 | Harris et al. | |
| 4,646,326 A | 2/1987 | Backof, Jr. et al. | |
| 4,703,507 A | 10/1987 | Holden | |
| 5,007,087 A | 4/1991 | Bernstein et al. | |
| 5,048,086 A | 9/1991 | Bianco et al. | |
| 5,077,793 A * | 12/1991 | Falk et al. ............... | 380/28 |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,598,476 A | 1/1997 | LaBarre et al. | |
| 5,757,923 A | 5/1998 | Koopman, Jr. | |
| 5,811,998 A | 9/1998 | Lundberg et al. | |
| 5,852,630 A | 12/1998 | Langberg et al. | |
| 5,900,835 A | 5/1999 | Stein | |

(Continued)

FOREIGN PATENT DOCUMENTS

EP 0 849 664 A2 6/1998

(Continued)

OTHER PUBLICATIONS

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

(Continued)

*Primary Examiner* — Kambiz Zand
*Assistant Examiner* — Benjamin Kaplan
(74) *Attorney, Agent, or Firm* — Fox Rothschild, LLP; Robert J. Sacco

(57) ABSTRACT

A cryptographic system (CS) is provided. The CS (500) is comprised of a data stream receiving means (DSRM), a ring generator (RG) and an encryptor. The DSRM (602) provides a data stream (DS). The RG (400) includes a computing (404-408), converting (404-408) and permutation (410) means. The computing means is configured to perform RNS arithmetic operations to express a random number in a random number sequence as RNS residue values (RNSRV). The converting means is configured to convert each RNSRV to a relatively prime number system so that each RNSRV includes at least one digit. The permutation means is configured to generate an arbitrary permutation ordering of output sequence numbers (OSNs) using a select combination of digits associated with each RNSRV. The arbitrary permutation ordering is determined using a cyclic structure. The encryptor is configured to generate a modified data stream by combining the OSNs and DS.

23 Claims, 10 Drawing Sheets

U.S. PATENT DOCUMENTS

| | | | |
|---|---|---|---|
| 5,924,980 A | 7/1999 | Coetzee | |
| 5,937,000 A | 8/1999 | Lee et al. | |
| 6,014,446 A | 1/2000 | Finkelstein | |
| 6,023,612 A | 2/2000 | Harris et al. | |
| 6,038,317 A | 3/2000 | Magliveras et al. | |
| 6,078,611 A | 6/2000 | La Rosa et al. | |
| 6,304,216 B1 | 10/2001 | Gronemeyer | |
| 6,331,974 B1 | 12/2001 | Yang et al. | |
| 6,377,782 B1 | 4/2002 | Bishop et al. | |
| 6,570,909 B1 | 5/2003 | Kansakoski et al. | |
| 6,614,914 B1 | 9/2003 | Rhoads et al. | |
| 6,744,893 B1 | 6/2004 | Fleming-Dahl | |
| 6,754,251 B1 | 6/2004 | Sriram et al. | |
| 6,766,345 B2 | 7/2004 | Stein et al. | |
| 6,842,479 B2 | 1/2005 | Bottomley | |
| 6,980,656 B1 | 12/2005 | Hinton, Sr. et al. | |
| 6,986,054 B2 | 1/2006 | Kaminaga et al. | |
| 7,023,323 B1 | 4/2006 | Nysen | |
| 7,027,598 B1 | 4/2006 | Stojancic et al. | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 | 8/2006 | Okubo et al. | |
| 7,133,522 B2 | 11/2006 | Lambert | |
| 7,170,997 B2 | 1/2007 | Petersen et al. | |
| 7,190,681 B1 | 3/2007 | Wu | |
| 7,200,225 B1 | 4/2007 | Schroeppel | |
| 7,233,969 B2 | 6/2007 | Rawlins et al. | |
| 7,233,970 B2* | 6/2007 | North et al. | 708/491 |
| 7,245,723 B2 | 7/2007 | Hinton, Sr. et al. | |
| 7,269,198 B1 | 9/2007 | Elliott et al. | |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,529,292 B2 | 5/2009 | Bultan et al. | |
| 7,643,537 B1 | 1/2010 | Giallorenzi et al. | |
| 7,779,060 B2 | 8/2010 | Kocarev et al. | |
| 7,830,214 B2 | 11/2010 | Han et al. | |
| 7,853,014 B2 | 12/2010 | Blakley et al. | |
| 2002/0099746 A1 | 7/2002 | Tie et al. | |
| 2003/0044004 A1* | 3/2003 | Blakley et al. | 380/28 |
| 2004/0001556 A1 | 1/2004 | Harrison et al. | |
| 2004/0059767 A1 | 3/2004 | Liardet | |
| 2004/0196212 A1 | 10/2004 | Shimizu | |
| 2005/0031120 A1 | 2/2005 | Samid | |
| 2005/0050121 A1 | 3/2005 | Klein et al. | |
| 2005/0089169 A1 | 4/2005 | Kim et al. | |
| 2005/0207574 A1 | 9/2005 | Pitz et al. | |
| 2005/0274807 A1 | 12/2005 | Barrus et al. | |
| 2006/0072754 A1 | 4/2006 | Hinton et al. | |
| 2006/0123325 A1 | 6/2006 | Wilson et al. | |
| 2006/0209932 A1 | 9/2006 | Khandekar et al. | |
| 2006/0251250 A1 | 11/2006 | Ruggiero et al. | |
| 2007/0121945 A1 | 5/2007 | Han et al. | |
| 2007/0230701 A1 | 10/2007 | Park et al. | |
| 2008/0008320 A1 | 1/2008 | Hinton et al. | |
| 2008/0016431 A1 | 1/2008 | Lablans | |
| 2008/0095215 A1 | 4/2008 | McDermott et al. | |
| 2008/0198832 A1 | 8/2008 | Chester | |
| 2008/0263119 A1 | 10/2008 | Chester et al. | |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1 | 12/2008 | Chester et al. | |
| 2008/0307022 A1 | 12/2008 | Michaels et al. | |
| 2008/0307024 A1 | 12/2008 | Michaels et al. | |
| 2009/0034727 A1 | 2/2009 | Chester et al. | |
| 2009/0044080 A1 | 2/2009 | Michaels et al. | |
| 2009/0122926 A1 | 5/2009 | Azenkot et al. | |
| 2009/0196420 A1 | 8/2009 | Chester et al. | |
| 2009/0202067 A1 | 8/2009 | Michaels et al. | |
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0323766 A1 | 12/2009 | Wang et al. | |
| 2009/0327387 A1 | 12/2009 | Michaels et al. | |
| 2010/0111296 A1 | 5/2010 | Brown et al. | |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO 2008 065191 | 6/2008 |
| WO | WO-2008130973 A1 | 10/2008 |
| WO | WO 2009 146283 | 12/2009 |

OTHER PUBLICATIONS

Morsche et al., "Signals and Systems," lecture notes, University of Eindhoven, The Netherlands (1999).

Pourbigharaz F. et al, "Modulo-Free Architecture for Binary to Residue Transformation with Respect to (2m-1, 2m, 2m+1) Moduli Set", IEEE International Symposium on Circuits and Systems, May 30-Jun. 2, 1994, pp. 317-320, vol. 2, London, UK.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D.E., "The Art of Computer Programming, Third Edition; vol. 2 Seminumerical Algorithms". Feb. 2005, Addison-Wesley, Boxton 310200, XP002511903, pp. 142-146, 284-292.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

U.S. Appl. No. 11/751,783, Michaels, Alan J.

Barile, Margherita, "Bijective," From MathWorld—A Wolfram Web Resource, created by Eric W. Weisstein. http://mathworld.wolfram.com/Bijective.html.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems, New York, NY : IEEE, US, vol. 3, May 6, 2001, pp. 216-216, XP01054114, ISBN: 978-0-7803-6685-5.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17TH International Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008 , pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Michaels, et al., U.S. Appl. No. 12/496,214, filed Jul. 1, 2009, entitled "Anti-Jam Communications Having Selectively Variable PAPR Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled, "Multi-Tier AD-HOC Network Communications".

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al. "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1__1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE Africon 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Taylor, F.J., "Residue Arithmetic A Tutorial with Examples", Computer, vol. 17, No. 5, pp. 50-62, May 1984.

\* cited by examiner

CRYPTOGRAPHIC SYSTEM CONFIGURED FOR EXTENDING A REPETITION PERIOD OF A RANDOM SEQUENCE

BACKGROUND OF THE INVENTION

1. Statement of the Technical Field

The inventive arrangements relate to cryptographic systems having a means configured for extending a repetition period of a random sequence. More particularly, the inventive arrangements relate to ring generators configured for generating a random sequence base on an arbitrary permutation ordering of numbers.

2. Description of the Related Art

Many cryptographic systems requiring random sequences typically include ring generators and/or other cyclic structures. A ring generator is a simple structure over a finite field that exhaustively produces possible outputs through repeated mapping. The mapping is some combination of an additive and a multiplicative mapping, with irreducible polynomials being ideal. For example, a ring generator includes repeated computations of an irreducible polynomial $f(x)=3x^3+3x^2+x$ on a finite Galois field GF[11]. A main limitation of a ring generator is that its orbits are highly deterministic. As such, knowledge of a mapping and current finite field conditions gives complete knowledge of an output sequence.

In cryptographic systems requiring random sequences, ring generators are often employed in algorithms for modifying a sequence of data bits. Such algorithms typically include arithmetic operations to be performed in a finite or Galois field. A finite or Galois field GF[p] is a field that contains only finitely many elements, namely $\{0, 1, 2, \ldots, p-1\}$. As such, all arithmetic operations performed in the finite or Galois field result in an element within that field. The finite or Galois field GF[p] has a finite field size defined by the Galois characteristic p. As such, any output sequence created through repeated mapping of a time invariant operator repeats every $p^{th}$ element. This repetitive behavior produces correlations thereby making the decoding of an output sequence relatively easy when p is small. Consequently, the algorithms also typically include operations for expanding the finite or Galois field size so that the period of repetition is increased.

There are many methods known in the art for expanding a finite or Galois field GF[p] where p is an integer power of two (2), $2^k$. The simplest such method for expanding a finite or Galois field GF[$2^k$] within an isomorphism includes increasing a number of input bits. Other methods include coupling the ring generator to other generators. For example, the ring generator may be coupled to an arbitrary number of other generators (assumed to have a mutually prime characteristic) comprised of digital hardware implementing the Chinese Remainder Theorem (CRT). As should be understood, CRT computations are performed to combine mixed-radix computations. CRT computations may only be used if inputs to the generator are mutually prime numbers. Despite the advantages of this method, it suffers from certain drawbacks. For example, this method is cyclic and fixed by nature. CRT computations of elements in odd prime number bases with digital hardware are computationally inefficient. Also, an output sequence of the generator is highly deterministic if the mutually prime numbers and initial conditions are known a priori.

These cryptographic systems requiring random sequences also typically rely on deterministic scrambling methods to help mask an output sequence so that an outside observer is unable to determine the output sequence. Scrambling methods are used to increase the entropy of an output relative to any given sequence of inputs. As such, these cryptographic systems include scramblers. A scrambler operates according to a deterministic scrambling algorithm so that the original signal can be recovered from a scrambled signal. Deterministic scrambling methods and associated algorithms are well known to persons skilled in the art, and therefore will not be described in detail herein.

However, it should be understood that one such deterministic scrambling method includes implementing a deterministic scrambling algorithm that uses substitution box (S-box) functions to scramble data. An S-box is an array of numbers used to add additional variance into an output sequence of a cryptographic system in order to protect the output sequence from reverse engineering. An S-box function often has a number of desired properties. For example, a deterministic scrambling algorithm uses an S-box, but a deterministic descrambling algorithm uses an inverse of the S-box. As such, the S-box function is invertible so that an output sequence can be obtained from a scrambled sequence. This deterministic scrambling method also includes creating complex mixing networks, such as a Feistel structure. As should be understood, a Feistel structure combines multiple rounds of repeated operations. Such operations include, but are not limited to, bit-shuffling, nonlinear functions, and linear functions. Despite the advantages of this deterministic scrambling method, it suffers from certain drawbacks. For example, this deterministic scrambling method is time-invariant. This deterministic scrambling method can also be resource intensive.

In view of the forgoing, there remains a need for a method for expanding a finite or Galois field size that is more computationally efficient than conventional finite field expansion methods. There is also a need for an invertible method for increasing the entropy of an output sequence that is more computationally efficient than conventional deterministic scrambling methods. Such methods also need to be designed for providing a high degree of security feature to a cryptographic system. Most significantly, there is further a need for a method and apparatus for generating an arbitrary permutation ordering of numbers that can be used in a variety of cryptographic system applications.

SUMMARY OF THE INVENTION

The invention concerns a cryptographic system. The cryptographic system is comprised of a data stream source, a ring generator and an encryptor. The data stream source is configured to provide an input data stream. The ring generator is comprised of a computing means, a converting means, and a permutation means. The computing means is configured to perform one or more RNS arithmetic operations to express a random number in a random number sequence as one or more RNS residue values. The converting means is configured to convert each of the RNS residue values to a relatively prime number system so that each of the RNS residue values includes at least one digit. The permutation means is configured to generate an arbitrary permutation ordering of output sequence numbers using a select combination of digits associated with each of the RNS residue values. The arbitrary permutation ordering is determined using a cyclic structure. The encryptor is coupled to the data stream source and the ring generator. The encryptor is configured to generate a modified data stream by incorporating or combining the output sequence numbers with the input data stream.

According to an aspect of the invention, each random number in the random number sequence has a value within a range of zero to n!−1. The cyclic structure has n elements. Each of the output sequence numbers is associated with a respective element of the n elements.

According to another aspect of the invention, the computing means is further configured to calculate the RNS residue values using relatively prime numbers as moduli. The relatively prime numbers are selected to have a product equal to a decimal number defined by n!. The converting means is further configured to convert each of the RNS residue values to a different relatively prime number system.

According to another aspect of the invention, the select combination of digits are chosen so that a range of values which can be determined by the digits is equal to a number of available unselected elements in the cyclic structure. The permutation means is configured to use a value of the select combination of digits to select an available unselected element in the cyclic structure. The permutation means is also configured to use the Chinese Remainder Theorem to combine at least two digits associated with at least two RNS residue values to obtain a digit having a different number base equal to the product of the at least two digits. The permutation means is further configured to use the Chinese Remainder Theorem to combine with one or more additional cyclic ring generators. The permutation means is configured to use the digit having a different number base to select an available unselected element in the cyclic structure.

According to another aspect of the invention, the encryptor includes at least one of a multiplier, an adder, a digital logic device and a feedback mechanism. The encryptor is also configured to perform a combination method to mask the input data stream. The combination method may include one of a standard multiplication operation, a multiplication in a Galois extension field operation, an addition modulo q operation, a subtraction modulo q operation and a bitwise logic operation.

According to yet another aspect of the invention, the cryptographic system is comprised of a modified data stream receiving means. The modified data stream receiving means is configured to receive the modified data stream. The cryptographic system is also comprised of a second ring generator. The second ring generator is configured to generate a decryption sequence. The cryptographic system is further comprised of a decryptor. The decryptor is electronically connected to the modified data stream receiving means and the second ring generator. The decryptor is configured to generate decrypted data by performing a decryption method utilizing the modified data stream and the decryption sequence.

A second cryptographic system is provided. The second cryptographic system is comprised of a data stream receiving means (DSRM), a first ring generator, and a diffusion operator. The DSRM is configured to receive a data stream. The first ring generator includes a computing means, a converting means and a permutation means. The computing means is configured to perform a plurality of RNS arithmetic operations to express a random number in a random number sequence as a plurality of RNS residue values. The converting means is configured to convert each of the RNS residue values to a relatively prime number system so that each of the RNS residue values includes at least one digit. The permutation means is configured to generate an arbitrary permutation ordering of the output sequence numbers using a select combination of digits associated with each of the RNS residue values. The arbitrary permutation ordering is determined using a cyclic structure. The diffusion operator is coupled to the DSRM and the first ring generator. The diffusion operator is configured to generate a diffused data stream by permuting the data stream using the arbitrary permutation ordering of output sequence numbers.

According to an aspect of the invention, the random number has a value within a range of zero to n!−1 and the cyclic structure has n elements. Each of the output sequence numbers is associated with a respective element of the n elements. The computing means is further configured to calculate the RNS residue values using relatively prime numbers as moduli. The relatively prime numbers are selected to have a product equal to a decimal number defined by n!. The converting means is further configured to convert each of the RNS residue values to a different relatively prime number system. The select combination of digits is chosen so that a range of values which can be determined by the digits is equal to a number of available unselected elements in the cyclic structure.

The permutation means is configured to use a value of the select combination of digits to select an available unselected element in the cyclic structure. The permutation means is also configured to use a Chinese Remainder Theorem to combine at least two digits associated with at least two RNS residue values to obtain a digit having a different number base than the digits. The permutation means is further configured to use the Chinese Remainder Theorem to combine with one or more additional cyclic ring generators. The permutation means is configured to use the digit having a different number base to select an available unselected element in the cyclic structure.

According to yet another aspect of the invention, the cryptographic system includes a diffused data stream receiving means (DDSRM), a second ring generator and a reverse diffusion operator. The DDSRM is configured to receive the diffused data stream. The second ring generator is configured to generate a reverse diffusion sequence. The reverse diffusion sequence is comprised of pseudo-random numbers or pseudo-chaotic random numbers. The reverse diffusion operator is coupled to the DDSRM and the second ring generator. The diffusion operator is configured to un-diffuse the diffused data stream by performing reverse diffusion operations utilizing the reverse diffusion sequence.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Some embodiments of the present invention provide an algorithm for extending a random number sequences repetition period. Such embodiments also provide an algorithm for generating an arbitrary permutation ordering of numbers. In this regard, it should be appreciated that such an algorithm can be used in a variety of cryptographic system applications. For example, such an algorithm can be implemented in a ring generator or other cyclic structure for efficiently expanding a size of a finite or Galois field. The algorithm can also be implemented in a deterministic scrambling method. In such a scenario, the algorithm can be applied to subsets of an output sequence for masking the same. The algorithm can further be implemented in a pseudo-random number generator for increasing a random number sequence's repetition period.

Figure 1:
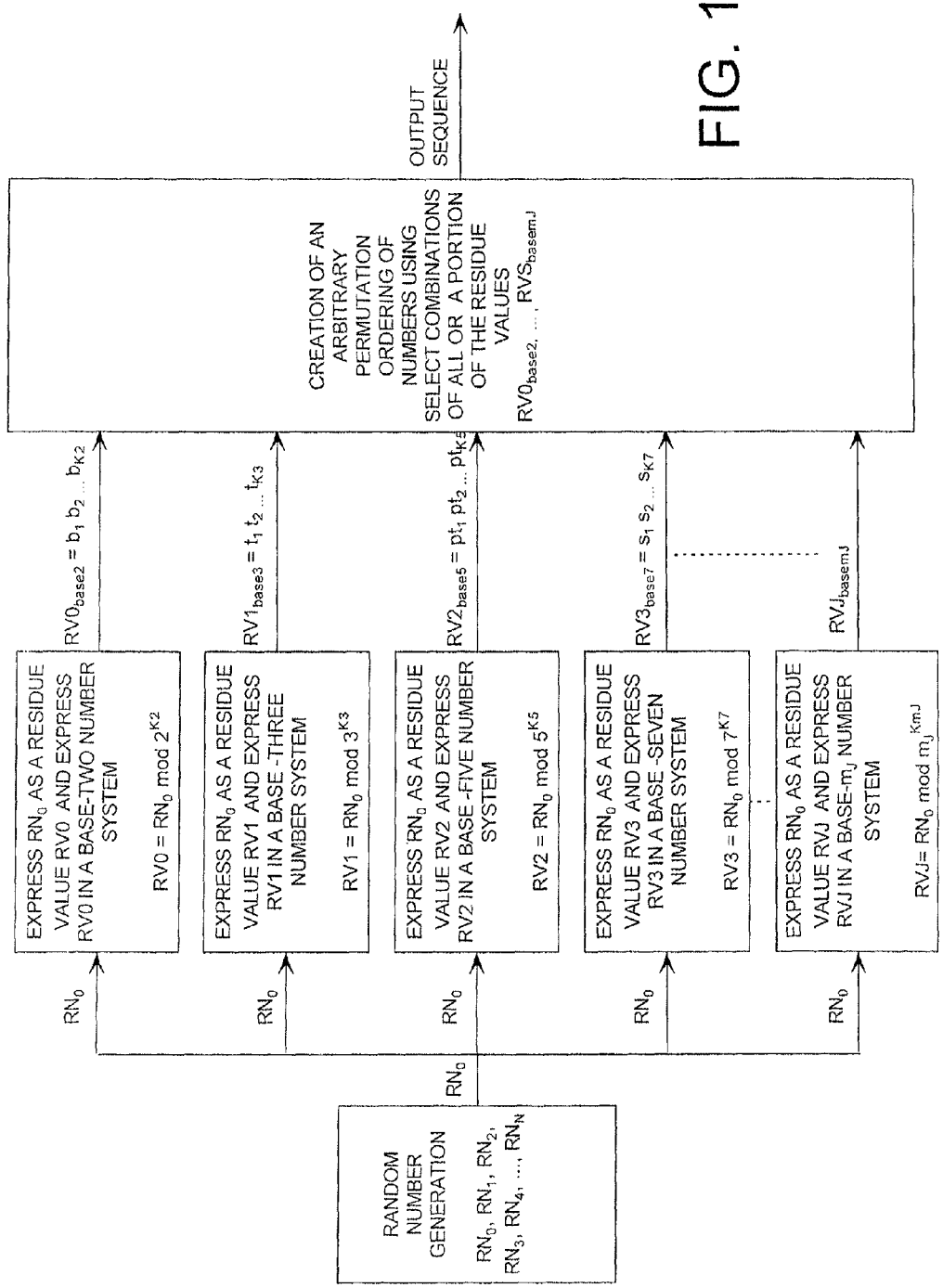
FIG. 1 is a conceptual diagram of an algorithm for extending a sequence's repetition period that is useful for understanding the invention.
Figure 2:
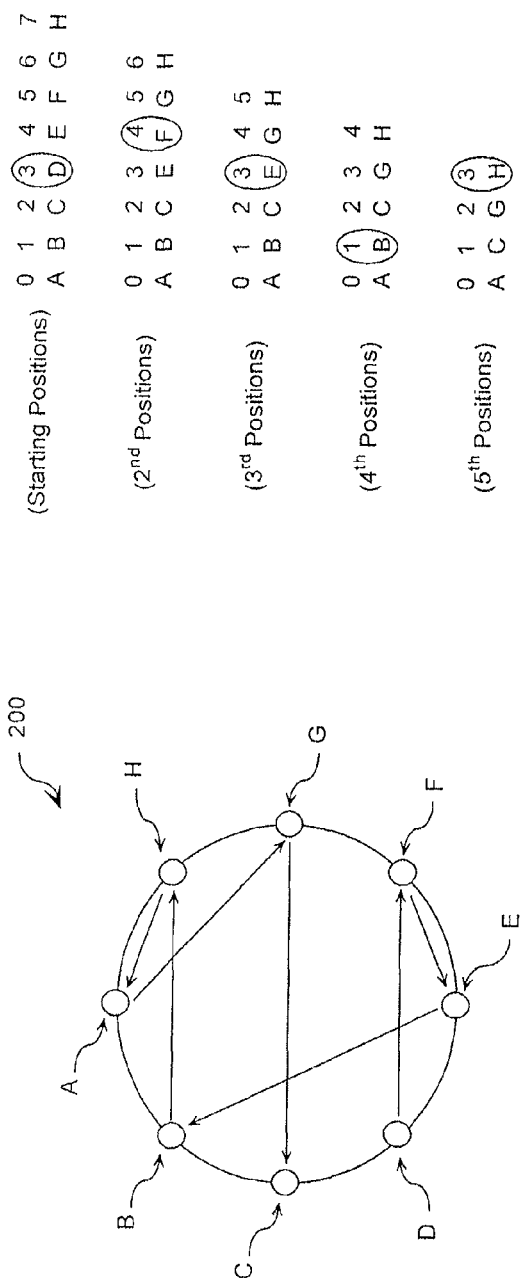
FIG. 2A is a schematic illustration of a cyclic structure that is useful for understanding the invention.
FIG. 2B is a table illustrating cyclic structure elements with associated starting position values and output sequence numbers that is useful for understanding the invention.
FIG. 2C is a schematic illustration of varying cyclic structure element positions that is useful for understanding the invention.

Referring now to FIG. 1, there is provided a conceptual diagram of an algorithm for extending a sequence's repetition period. In this regard, it should be appreciated that a sequence of random numbers $RN_0, \ldots, RN_N$ is generated. Each random number $RN_0, \ldots, RN_N$ has an integer value between zero (0) and n!−1. The sequence of random numbers $RN_0, \ldots, RN_N$ repeats after a certain period of time. As such, an algorithm is employed to extend this period of time. This algorithm is described in great detail below (in relation to FIGS. 1-2).

Referring again to FIG. 1, the algorithm begins with a random number $RN_0$ that has been computed by some defined arithmetic process. Such arithmetic processes are well known to persons skilled in the art. Therefore, the defined arithmetic process will not be described in detail herein. However, it should be appreciated that the arithmetic process can be an arithmetic process for computing a pseudo-random number or a pseudo-chaotic number. It should also be appreciated that each random number of the random number sequence $RN_0, \ldots, RN_N$ can have a decimal value between zero (0) and n!−1. n! is a factorial equivalent of a decimal value representing the total possible values that members of the random number sequence $RN_0, \ldots, RN_N$ can equal.

The random numbers $RN_0, \ldots, RN_N$ can be expressed in a decimal number system representation or a binary number system representation. If the random number sequence $RN_0, \ldots, RN_N$ is expressed in a decimal number system representation, then the random number sequence $RN_0, \ldots, RN_N$ is a decimal sequence of digits. The term "digit" as used herein refers to a single character in a weighted numbering system. For example, a sequence 45 has a digit 4 and a digit 5. The digit 4 is weighted such that it is ten (10) times the value of the digit 5. Each digit of the decimal sequence has a value of zero (0), one (1), two (2), three (3), four (4), five (5), six (6), seven (7), eight (8) or nine (9). The decimal sequence has a digit length selected in accordance with a particular algorithm application. If the random number sequence $RN_0, \ldots, RN_N$ is expressed in a weighted binary number system representation, then each random number $RN_0, \ldots, RN_N$ is a binary sequence of digits. Each digit of the binary sequence has a zero (0) value or a one (1) value. The binary sequence has a digit length selected in accordance with a particular algorithm application.

Each random number $RN_0, \ldots, RN_N$ can be expressed as a set of residue number system (RNS) residue values $RV0, \ldots, RVJ$ using RNS arithmetic operations, i.e. modulo operations. Modular arithmetic is well known to persons skilled in the art. Thus, such operations will not be described in great detail herein. However, it should be appreciated that a RNS residue value can be defined by mathematical Equation (1).

$$RV_p = RN_n \text{ modulo } m_p \quad (1)$$

where $RV_p$ is a RNS residue value representing a random number $RN_n$ modulo $m_p$;

$RN_n$ is one of the random numbers in the random number sequence $RN_0, \ldots, RN_N$; and $m_p$ is a modulus which can have a value $base^k_{base}$.

The moduli $m_p = m_0^{km0}, m_1^{km1}, \ldots, m_J^{kmJ}$ are selected to have a value defined by the unique prime factorization of n!. As noted above, n! is the number of total possible values that the random number sequence $RN_0, \ldots, RN_N$ can equal. In this regard, it should be appreciated that the Fundamental Theorem of Arithmetic (FTA) can be used to write the random number as a unique product of relatively prime numbers, which are automatically mutually prime when separated into distinct powers of individual primes. The phrase "relatively prime numbers" as used herein refers to a collection of numbers having a greatest common divisor of one (1). For example, a factorial of eight (8!) equals a decimal number having a value of forty thousand three hundred twenty (40, 320). This decimal number can be expressed as a product of prime numbers ($40,320 = 2^{K2} \cdot 3^{K3} \cdot 5^{K5} \cdot 7^{K7} = 2^7 \cdot 3^2 \cdot 5^1 \cdot 7^1$). In such a scenario, each RNS arithmetic operation employed for expressing each random number in the sequence $RN_0, \ldots, RN_K$ as a set of RNS residue values $RV0, \ldots, RVJ$ can use the relatively prime numbers $2^7, 3^2, 5^1, 7^1$ as a moduli $m_0^{km0}, m_1^{km1}, m_2^{km2}, m_3^{km3}$, respectively. As should be understood, residue number systems yield the largest potential for gains in computational efficiency when the individual moduli are as small as possible. Further, factors of two (2) are a special case (being inherently efficient) since digital hardware is optimized for binary arithmetic.

Referring again to FIG. 1, each RNS residue value $RV0, \ldots, RVJ$ can be expressed in a different relatively prime number system representation. In this regard, it should be appreciated that an advantage of using different relatively prime number systems is that operations in one (1) residue space can be performed independently from other residue spaces. After independently performing a plurality of residue computations, the results of said computations can be recombined via an algorithm, such as a Chinese Remainder Theorem algorithm. The recombination results can be used to efficiently implement a permutation ordering of numbers that is the same as a permutation ordering of numbers within an isomorphism defined by the random numbers $RN_0, \ldots, RN_N$.

According to an embodiment of the invention, a RNS residue value RV0 can be expressed in a binary number system (i.e., a base-two system) representation. As such, the residue value $RV0_{base2}$ is a sequence of binary digits. Each binary digit has a value of zero (0) or one (1). The RNS residue value RV1 can be expressed in a tertiary number system (i.e., a base-three system) representation. Accordingly, the RNS residue value $RV1_{base3}$ is a sequence of tertiary digits. Each tertiary digit has a value of zero (0), one (1) or two (2). The RNS residue value RV2 can be expressed in a pentiary number system (i.e., a base-five system) representation. Hence, the RNS residue value $RV2_{base5}$ is a sequence of pentiary digits. Each pentiary digit has a value of zero (0), one (1), two (2), three (3), or four (4). The RNS residue value RV3 can be expressed in a septiary number system (i.e., a base-seven system) representation. Therefore, the RNS residue value $RV3_{base7}$ is a sequence of septiary digits. Each septiary digit has a value of zero (0), one (1), two (2), three (3), four (4), five (5), or six (6). Still, the invention is not limited in this regard.

Referring again to FIG. 1, either a partial or complete arbitrary permutation ordering of numbers is created using select combinations of all or a portion of the RNS residue values $RV0_{base2}, \ldots, RVJ_{basemJ}$. In this regard, it should be appreciated that each RNS residue value $RV0_{base2}, \ldots, RVJ_{basemJ}$ is comprised of one or more digits. For example, the RNS residue value $RV0_{base2}$ can be comprised of binary digits $b_1 b_2 \ldots b_{K2}$. The RNS residue value $RV1_{base3}$ can be comprised of tertiary digits $t_1 t_2 \ldots t_{K3}$. The RNS residue value $RV2_{base5}$ can be comprised of a pentiary digit $pt_1 pt_2 \ldots pt_{K5}$. The RNS residue value $RV3_{base7}$ can be comprised of a septiary digit $s_1 s_2 \ldots s_{K7}$. In such a scenario, an arbitrary permutation ordering of output sequence numbers can be determined and applied to a cyclic structure such as that shown in FIG. 2A.

Referring now to FIGS. 2A-2B, the cyclic structure 200 is comprised of a plurality of elements A, B, . . . , H. The number of elements A, B, . . . , H is defined by the decimal number n of n!. As noted above, n! is the number of total possible values that the random number sequence $RN_0, \ldots, RN_N$ can equal. In order for the method disclosed herein to specify a particular one of the elements A, B, . . . , H, it is useful to assign each element a corresponding starting position value. According to an embodiment of the invention shown in FIGS. 2A-2B, the element A has a starting position zero (0). The element B has a starting position one (1). The element C has a starting position two (2), and so on. Still, the invention is not limited in this regard. For example, the element A can alternatively have a starting position one (1). The element B can alternatively have a starting position two (2). The element C can alternatively have a starting position three (3), and so on. Similarly, in order for the method disclosed herein to specify a particular output sequence, it is useful to assign each element a corresponding output sequence number. According to the embodiment of the invention shown in FIGS. 2A-2B, the element A has a corresponding output sequence number of one (1). The element B has a corresponding output sequence number of two (2). The element C has a corresponding output sequence number of three (3), and so on. Still, the invention is not limited in this regard.

Referring again to FIG. 1 and FIGS. 2A-2C, a cyclic structure 200 sequence of elements is determined using all or a portion of the RNS residue values RV0, . . . , RVJ. For example, if there are eight (8) possible elements A, B, . . . , H in the cyclic structure 200, then a first number of the output sequence can be determined uniquely using any set of three residue value $RV0_{base2}$ digits (e.g., $b_1 b_2 b_3$). As should be understood, the digit set $b_1 b_2 b_3$ can have an associated decimal value of zero (0), one (1), two (2), three (3), four (4), five (5), six (6) or seven (7). For example, if the binary digits $b_1 b_2 b_3$ have the binary value of 0 0 0, then the binary value would convert to a decimal value of zero (0). In contrast, if the binary digits $b_1 b_2 b_3$ have the binary value of 1 1 1, then the binary value would convert to a decimal value of seven (7). If this digit set $b_1 b_2 b_3$ has an associated decimal value of three (3), then the starting element in the cyclic structure 200 sequence is an element having starting position three (3) within the elements A-H, i.e., element D as shown in FIG. 2C. Accordingly, a first number of the output sequence has a decimal value of four (4), i.e., the value of the output sequence number associated with the element D as shown in FIG. 2B.

Consequently, there are now seven (7) elements A, B, C, E, F, G, H to select as a second element in the cyclic structure 200 sequence. As such, a second number of the output sequence can be determined uniquely using a septiary digit of the residue value $RV3_{base7}$ (e.g., $s_1$). As should be understood, the septiary digit $s_1$ can have an associated decimal value of zero (0), one (1), two (2), three (3), four (4), five (5) or six (6). If the septiary digit $s_1$ has an associated decimal value of four (4), then the second element in the cyclic structure 200 sequence is the element in position four (4) within the elements A-C and E-H, i.e., element F as shown in FIG. 2C. The second number of the output sequence has a decimal value of six (6), i.e., the value of the output sequence number associated with the element F as shown in FIG. 2B.

There are now six (6) elements A, B, C, E, G, H to select as a third element in the cyclic structure 200 sequence. As such, a third number of the output sequence can be determined uniquely using a binary digit of the residue value $RV0_{base2}$ (e.g., $b_4$) and a tertiary digit $t_1$ of the RNS residue value $RV1_{base3}$ (e.g., $t_1$). As should be understood, the fourth binary digit $b_4$ can have a value of zero (0) or one (1). The first tertiary digit $t_1$ can have a value of zero (0), one (1) or two (2). These two mixed-radix digits may be combined via the Chinese Remainder Theorem (CRT) to obtain a single effective base-six digit value. Mixed-radix recombination via the CRT or similar methods is well understood by persons skilled in the art. Therefore, the CRT and similar methods will not be described in detail herein. If the fourth binary digit $b_4$ has a value of one (1) and the first tertiary digit $t_1$ has a value of zero (0), then the third element in the cyclic structure 200 sequence is the element in position three (3) within the elements A-C, E, and G-H, i.e., element E as shown in FIG. 2C. Notably, the position value of three (3) is obtained using the CRT. The third number in the output sequence has a decimal value of five (5), i.e., the value of the output sequence number associated with the element E as shown in FIG. 2B.

There are now five (5) elements A, B, C, G, H to select as a fourth element in the cyclic structure 200 sequence. As such, a fourth number of the output sequence can be determined uniquely using a pentiary digit of the RNS residue value $RV2_{base5}$ (e.g. $pt_1$). As should be understood, the pentiary digit $pt_1$ can have a decimal value of zero (0), one (1), two (2), three (3), or four (4). If the pentiary digit $pt_1$ has a decimal value of one (1), then the fourth element in the cyclic structure 200 sequence is the element in position one (1) within the elements A-C and G-H, i.e., element B as shown in FIG. 2C. The fourth number in the output sequence has a decimal value of two (2), i.e., the value of the output sequence number associated with the element B as shown in FIG. 2B.

There are now four (4) elements A, C, G, H to select as a fifth element in the cyclic structure 200 sequence. As such, a fifth number of the output sequence can be determined uniquely using a set of two RNS residue value $RV0_{base2}$ digits (e.g., $b_5 b_6$). As should be understood, the binary digit set $b_5$ $b_6$ can have an associated decimal value of zero (0), one (1), two (2) or three (3). For example, if the binary digit set $b_5 b_6$ have a binary value of 0 0, then the binary value would convert to a decimal value of zero (0). In contrast, if the binary digit set $b_5 b_6$ have a binary value of 1 1, then the binary value would convert to a decimal value of three (3). If the binary digit set $b_5 b_6$ has a decimal value of three (3), then the fifth element in the cyclic structure 200 sequence is the element in position three (3) within the elements A, C, G, and H, i.e., element H as shown in FIG. 2C. The fifth number in the output sequence has a decimal value of eight (8), i.e., the value of the output sequence number associated with the element H as shown in FIG. 2B.

There are now three (3) elements A, C, G to select as a sixth element in the cyclic structure 200 sequence. As such, a sixth number of the output sequence can be determined uniquely using a tertiary digit of the RNS residue value $RV1_{base3}$ (e.g., $t_2$). As should be understood, the second tertiary digit $t_2$ can have a value of zero (0), one (1), or two (2). If the second tertiary digit $t_2$ has a decimal value of zero (0), then the sixth element in the cyclic structure 200 sequence is the element in position zero (0) within the elements A, C, and G, i.e., element A as shown in FIG. 2C. The sixth number in the output sequence has a decimal value of one (1), i.e., the value of the output sequence number associated with the element A as shown in FIG. 2B.

There are now two (2) elements C, G to select as a seventh element in the cyclic structure 200 sequence. As such, a seventh number of the output sequence can be determined uniquely using the last binary digit of the RNS residue value $RV0_{base2}$ (e.g., $b_7$). As should be understood, the seventh binary digit $b_7$ can have a value of zero (0) or one (1). If the seventh binary digit $b_7$ has a value of one (1), then the seventh element in the cyclic structure 200 sequence is the element in position one (1) within the elements C and G, i.e., element G as shown in FIG. 2C. The seventh number in the output sequence has a decimal value of seven (7), i.e., the value of the output sequence number associated with the element G as shown in FIG. 2B. Consequently, there is only one element C to select as an eighth element in the cyclic structure 200 sequence. As such, the eighth number of the output sequence has a decimal value of three (3), i.e., the value of the output sequence number associated with the element C as shown in FIG. 2B.

The above described process can be iteratively performed for each of a plurality of random numbers $RN_0, \ldots, RN_N$. In this regard, it should be appreciated that there are n! possible output sequences of numbers one (1) through n. As noted above, n! is the number of total possible values that the random numbers $RN_0, \ldots, RN_N$ can equal. Consequently, the ordering of numbers in a plurality of output sequences will not repeat until the n·n!+1 output.

The following Examples are provided in order to further illustrate the present invention. The scope of the invention, however, is not to be considered limited in any way thereby.

EXAMPLE 1

A random number $RN_0$ can have a decimal value of zero to forty thousand three hundred nineteen (40,319). As such, the total possible values that the random number $RN_0$ can equal is forty thousand three hundred twenty (40,320). Using the Fundamental Theorem of Arithmetic, the number forty thousand three hundred twenty (40,320) can be written as $8! = 8 \cdot 7 \cdot \ldots \cdot 1 = 2^7 \cdot 3^2 \cdot 5^1 \cdot 7^1$. In effect, a cyclic structure employed in such a scenario includes n elements, i.e. eight (8) elements.

Each RNS arithmetic operation employed for expressing the random number $RN_0$ as a RNS residue value $RV0, \ldots, RV3$ uses the relatively prime numbers $2^7, 3^2, 5^1, 7^1$ as the set of moduli $m_0^{km0}, m_1^{km1}, m_2^{km2}, m_3^{km3}$. Accordingly, the RNS residue values $RV0, \ldots, RV3$ can be defined by mathematical Equations (2-5).

$$RV0 = RN_0 \text{ modulo } 2^7 \quad (2)$$

$$RV1 = RN_0 \text{ modulo } 3^2 \quad (3)$$

$$RV2 = RN_0 \text{ modulo } 5^1 \quad (4)$$

$$RV3 = RN_0 \text{ modulo } 7^1 \quad (5)$$

The RNS residue value $RV0, \ldots, RV3$ can be computed by substituting the value of the random number $RN_0$ into the mathematical Equations (2-5). If the random number $RN_0$ equals ten thousand three hundred eleven (10,311), then the RNS residue value $RV0$ equals seventy-one (71). The RNS residue value $RV1$ equals six (6). The RNS residue value $RV2$ equals one (1). The RNS residue value $RV3$ equals zero (0). Accordingly, the RNS residue values $RV0, \ldots, RV3$ can be defined by mathematical Equations (6-9).

$$RV0 = RN_0 \text{ modulo } 2^7 = 71 \quad (6)$$

$$RV1 = RN_0 \text{ modulo } 3^2 = 6 \quad (7)$$

$$RV2 = RN_0 \text{ modulo } 5^1 = 1 \quad (8)$$

$$RV3 = RN_0 \text{ modulo } 7^1 = 0 \quad (9)$$

Each RNS residue value $RV0, \ldots, RV3$ is expressed in a different base number system. Specifically, the RNS residue value $RV0$ is expressed in a base two system. As such, the RNS residue value $RV0_{base2}$ is a sequence of binary digits having values 1 0 0 0 1 1 1. The RNS residue value $RV1$ is expressed in a base three system. As such, the RNS residue value $RV1_{base3}$ is a sequence of tertiary digits having values 2 0. The RNS residue value $RV2$ is expressed in a base five system. As such, the RNS residue value $RV2_{base5}$ is a pentiary digit having a value 1. The RNS residue value $RV3$ is expressed in a base seven system. As such, the RNS residue value $RV3_{base7}$ is a septiary digit having a value 0. Accordingly, the RNS residue values $RV0_{base2}, \ldots, RV3_{base7}$ can be defined by mathematical Equations (10-13).

$$RV0_{base2} = RN_0 \text{ modulo } 2^7 7 = 71 = 1\ 0\ 0\ 0\ 1\ 1\ 1 \quad (10)$$

$$RV1_{base3} = RN_0 \text{ modulo } 3^2 = 6 = 2\ 0 \quad (11)$$

$$RV2_{base5} = RN_0 \text{ modulo } 5^1 = 1 = 1 \quad (12)$$

$$RV3_{base7} = RN_0 \text{ modulo } 7^1 = 0 = 0 \quad (13)$$

The first number of an output sequence is determined using the last three binary digits 111 of the RNS residue value $RV0_{base2}$. The second number of the output sequence is determined using the septiary digit 0 of the RNS residue value $RV3_{base7}$. The third number of the output sequence is determined using a fourth binary digit 0 of the RNS residue value $RV0_{base2}$ and a second tertiary digit 0 of the RNS residue value $RV1_{base3}$. The fourth number of the output sequence is determined using the pentiary digit 1 of the RNS residue value $RV2_{base5}$. The fifth number of the output sequence is determined using a second and third binary digit 0 0 of the RNS residue value $RV0_{base2}$. The sixth number of the output sequence is determined using a first tertiary digit 2 of the RNS residue value $RV1_{base3}$. The seventh number of the output sequence is determined using a first binary digit 1 of the RNS residue value $RV3_{base7}$. Consequently, the output sequence is 8 1 2 4 3 7 6 5.

EXAMPLE 2

A random number sequence of a size fifty-two factorial (52!) is chosen via any combination of number generation processes. The random number sequence of a size fifty-two factorial (52!) is approximately equal to eight times ten to the power of sixty-seven ($8 \cdot 10^{67}$). Using the Fundamental Theorem of Arithmetic, the number eight times ten to the power of sixty-seven ($8 \cdot 10^{67}$) can be written as $52! = 52 \cdot 51 \cdot \ldots \cdot 1 = 2^{49} \cdot 3^{23} \cdot 5^{12} \cdot 7^8 \cdot 11^4 \cdot 13^4 \cdot 17^3 \cdot 19^3 \cdot 23^2 \cdot 29^1 \cdot 31^1 \cdot 37^1 \cdot 41^1 \cdot 43^1 \cdot 47^1$. Alternately and more efficiently, a collection of fifteen (15) independent random number generators on each of the number bases can be used equivalently to produce an effective random number of size fifty-two factorial (52!). Following the same logic described above (in relation to FIGS. 1-2 and Example 1), a first number of an output sequence is determined using two (2) base-two digits and one (1) base-thirteen digit. A second number of an output sequence is determined using one (1) base-three digit and one (1) base-seventeen digit. A third number of an output sequence is determined using one (1) base-two digit and two (2) base-five digits, and so on. As should be understood, these mathematical operations may be implemented in hardware such that the same are performed in parallel. This parallel processing configuration results in a relatively quick and efficient computation.

EXAMPLE 3

A random number generator based on these combinatorial techniques can be constructed using an arbitrary mapping of n=233 elements as in cyclic ring 200, whose output is combined with some number of other cyclic ring generators. This combination may be performed using a method such as the Chinese Remainder Theorem. If the characteristics of the additional cyclic ring generators are odd primes exceeding two hundred thirty three (233), such as two hundred thirty nine (239), two hundred forty one (241), and two hundred fifty one (251), the effective repeat duration increases multiplicatively. Based on the four numbers in this example, the output sequence would only repeat after more than ten to the power of four hundred fifty nine ($10^{459}$) outputs. Moreover, the incorporation of these additional cyclic ring generators helps mask the deterministic properties of the permutation mapping.

Figure 3:
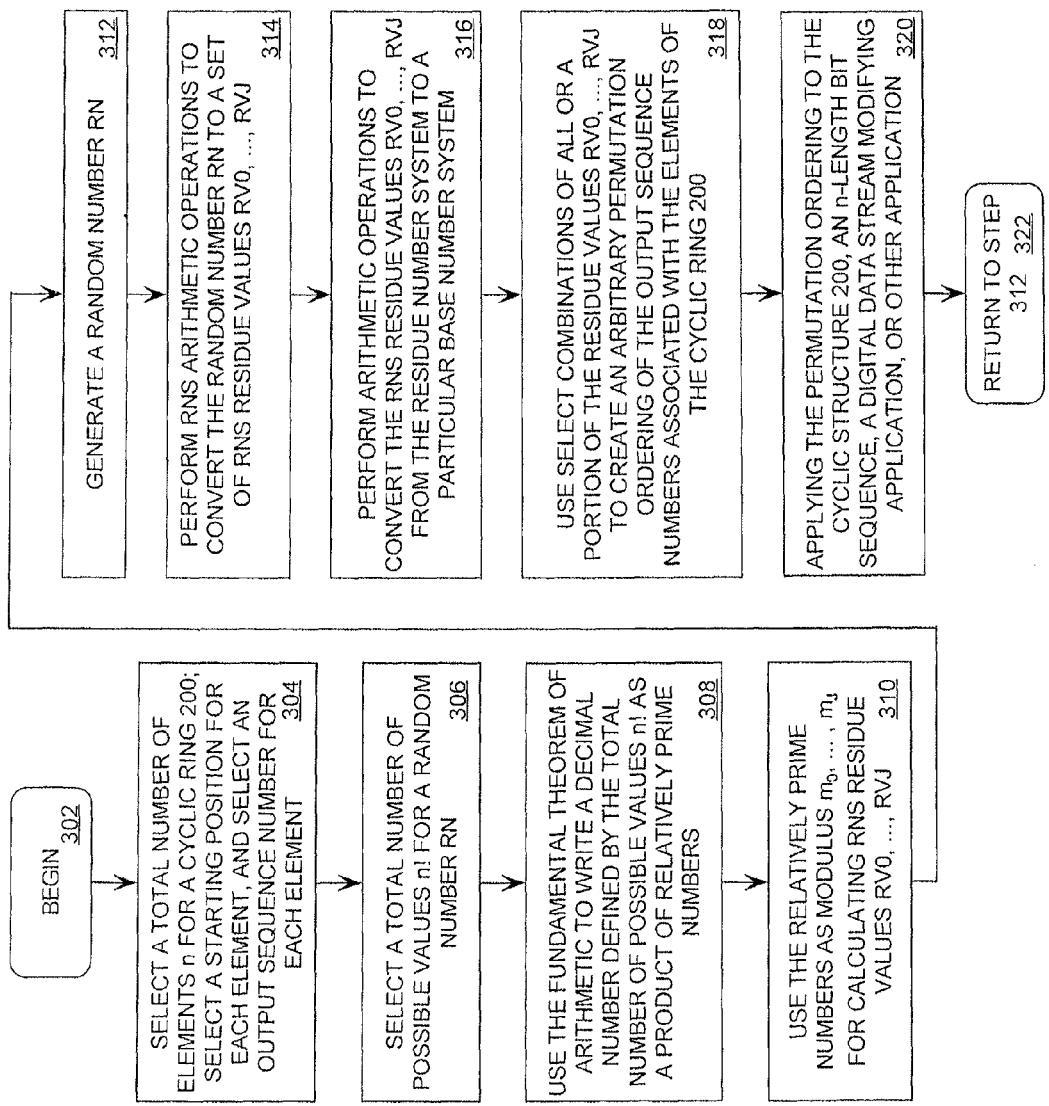
FIG. 3 is a flow diagram of a method for creating an arbitrary permutation ordering of numbers that is useful for understanding the invention.

Referring now to FIG. 3, there is provided a flow diagram of a method 300 for creating an arbitrary permutation ordering of numbers. The method 300 begins at step 302 and continues with step 304. In step 304, a total number of elements n for a cyclic structure 200 is selected. This step 304 also involves selecting a starting position for each element of the cyclic structure 200. For example, the element A has a position zero (0). The element B has a position of one (1). The element C has a position of two (2), and so on. This step 306 further includes selecting an output sequence number for each element. For example, an output sequence number associated with an element A has a value of one (1). An output sequence number associated with an element B has a value of two (2), and so on. Thereafter, step 306 is performed. Step 306 involves selecting the number of total possible values n! that a random number RN can equal.

As shown in FIG. 3, the method 300 continues with step 308. In step 308, a decimal number defined by the number of total possible values n! is written as a product of relatively prime numbers. In step 310, these relatively prime numbers are used as moduli $m_0^{km0}, m_1^{km1}, \ldots, m_J^{kmJ}$ for calculating RNS residue values RV0, ..., RVJ. Subsequently, step 312 is performed where a random number RN is generated. Thereafter, RNS arithmetic operations are performed to convert the random number RN to a set of RNS residue values RV0, ..., RVJ.

In step 316, arithmetic operations are performed to convert the RNS residue values RV0, ..., RVJ from the residue number system to a base number system. The base number system includes, but is not limited to, a base-two system, a base-three system, a base-five system, a base-seven system, a base-eleven system, a base-thirteen system, a base-seventeen system, a base-nineteen system, a base twenty-three system, a base twenty-nine system, and a base thirty-one system. In this regard, it should be understood that each RNS residue values RV0, ..., RVJ can be converted to a different base number system.

Thereafter, step 318 is performed where select combinations of all or a portion of the RNS residue value RV0, ..., RVJ are used to create a unique permutation ordering of the output sequence numbers. In this regard, it should be appreciated that the permutation ordering can be determined and applied to a cyclic structure such as that shown in FIG. 2A. In this regard, it should be understood that each output sequence number is associated with a certain element of the cyclic structure 200. Each combination of all or a portion of the RNS residue value RV0, ..., RVJ is used to determine which element of the cyclic structure 200 has a position equal to a decimal value of said combination. Once the element is identified, the output sequence number associated with the element is added to an output sequence. After step 318, step 320 is performed. In step 320, the permutation ordering is applied to the cyclic structure 200, an n-length bit sequence, a data stream modifying application, or other application. In this regard, it should be understood that the generated member of the random sequence of numbers is output for subsequent use. For example, a digital data stream is modified using the output sequence numbers. Thereafter, step 322 is performed where the method 300 returns to step 312.

As should be appreciated, an output sequence has a permutation order that changes per cycle of steps 312-320. In other words, the permutation order of the output sequence numbers is unique for each random number zero (0), one (1), ..., and n!−1. As such, the permutation order of each output sequence is seemingly random. Also, the permutation order of the output sequence numbers does not begin to repeat for n·n! outputs. As should also be appreciated, the method 300 can be used in a variety of cryptographic system applications. For example, such a method can be advantageously implemented in a ring generator of a cryptographic system based on the availability of random sequences. In such a scenario, the ring generator can produce an output sequence of numbers having an arbitrarily large chosen duration.

Figure 4:
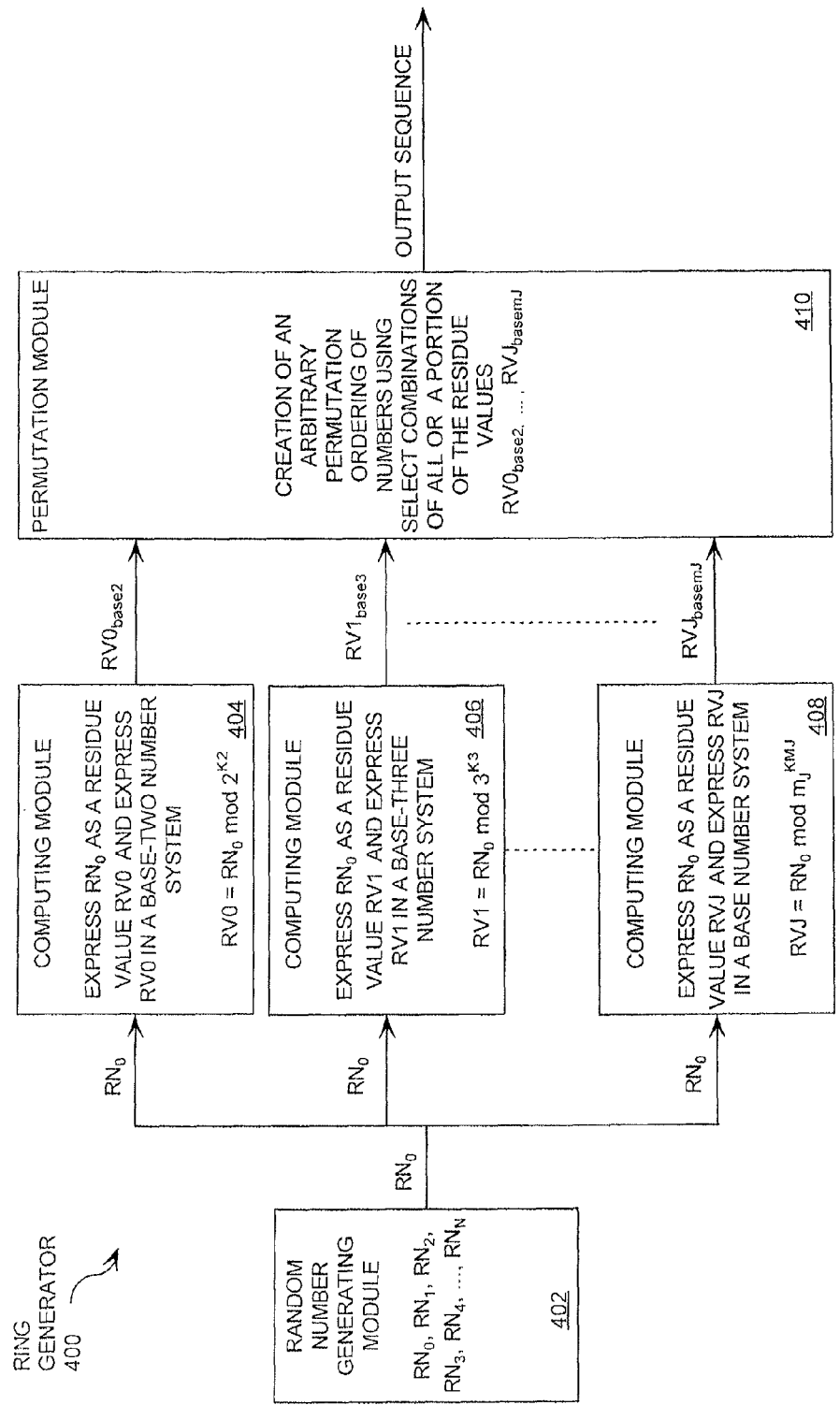
FIG. 4 is a block diagram of a ring generator that is useful for understanding the invention.

Referring now to FIG. 4, there is illustrated one embodiment of a ring generator 400 which could be used to implement the inventive arrangements. The ring generator 400 is comprised of a random number generating (RNG) module 402, computing modules 404, 406, 408, and a permutation module 410. The RNG module 402 is comprised of hardware and software configured for computing a sequence of random numbers $RN_0, \ldots, RN_N$ using some defined arithmetic process. Such arithmetic processes are well known to persons skilled in the art. Therefore, the defined arithmetic process will not be described in detail herein. However, it should be understood that the sequence of random numbers $RN_0, \ldots, RN_N$ can be any chosen sequence of pseudo-random numbers or pseudo-chaotic numbers.

Referring again to FIG. 4, the RNG module 402 can also be comprised of hardware and software configured for converting the random number sequence $RN_0, \ldots, RN_N$ from a decimal number system to a binary number system. In this regard, it should be understood that a random numbers $RN_0, \ldots, RN_N$ expressed in a binary number system representation includes a sequence of digits having a zero (0) value or a one (1) value. As such, the binary number system representation has a certain digit length BL (e.g., eight digits). The RNG module 402 is further comprised of hardware and software configured for communicating the random numbers $RN_0, \ldots, RN_N$ to the computing modules 404, 406, 408.

Each computing module 404, 406, 408 is comprised of hardware and software configured for performing an RNS arithmetic operation to convert a random number in the sequence $RN_0, \ldots, RN_N$ to a set of RNS residue values RV0, . . . , RVJ. In this regard, it should be understood that each RNS arithmetic operation employed for expressing a random number in the sequence $RN_0, \ldots, RN_N$ as a set of RNS residue values RV0, . . . , RVJ uses a different relatively prime number as a moduli $m_0^{km0}, m_1^{km1}, \ldots, m_J^{kmJ}$. Each relatively prime number is defined by a decimal number equal to a number of total possible values n! that each random number $RN_0, \ldots, RN_N$ can equal. The decimal number is expressed as a product of relatively prime numbers. These relatively prime numbers are used as the moduli $m_0^{km0}, m_1^{km1}, \ldots, m_J^{kmJ}$.

Referring again to FIG. 4, each computing module 404, 406, 408 is also comprised of hardware and software configured for converting each RNS residue value RV0, . . . , RVJ from a residue number system to a base number system. In this regard, it should be understood that each computing module 404, 406, 408 is configured to convert a respective RNS residue value RV0, . . . , RVJ from a residue number system to a particular base number system. For example, the computing module 404 is configured to convert the RNS residue value RV0 to a base two system. The computing module 406 is configured to convert the RNS residue value RV1 to a base three system. The computing module 408 is configured to convert the RNS residue value RVJ to a base seven system. Still, the invention is not limited in this regard.

Each computing module 404, 406, 408 is further comprised of hardware and software configured for communicating a respective residue value RV0, . . . , RVJ to the permutation module 410. The permutation module 410 is comprised of hardware and software configured for using select combinations of all or portion of the RNS residue values RV0, . . . , RVJ to create an arbitrary permutation ordering of the output sequence numbers. The permutation module 410 is also comprised of hardware and software configured for generating an output comprised of a unique permutation ordering of the output sequence numbers. In this regard, it should be appreciated that the permutation ordering is determined and applied to a cyclic structure such as that shown in FIG. 2A. In this regard, it should be appreciated that each output sequence number is associated with a certain element of the cyclic structure 200. Each combination of all or a portion of the RNS residue value RV0, . . . , RVJ is used to determine which element of the cyclic structure has a position equal to a decimal value of said combination. Once the element is identified, the output sequence number associated with the element is added to the output sequence. The permutation module 410 is further comprised of hardware and software configured for communicating an output sequence to an external device (not shown). The external device can be configured for modifying a digital data stream using output sequence numbers contained in an output sequence. According to an aspect of the invention, the permutation module 410 is configured to use the Chinese Remainder Theorem to combine with one or more additional cyclic ring generators. Still, the invention is not limited in this regard.

A person skilled in the art will appreciate that the ring generator 400 illustrates an exemplary architecture of a RNS-based permutation mapping. However, the invention is not limited in this regard and any other ring generator architecture can be used without limitation.

Figure 5:
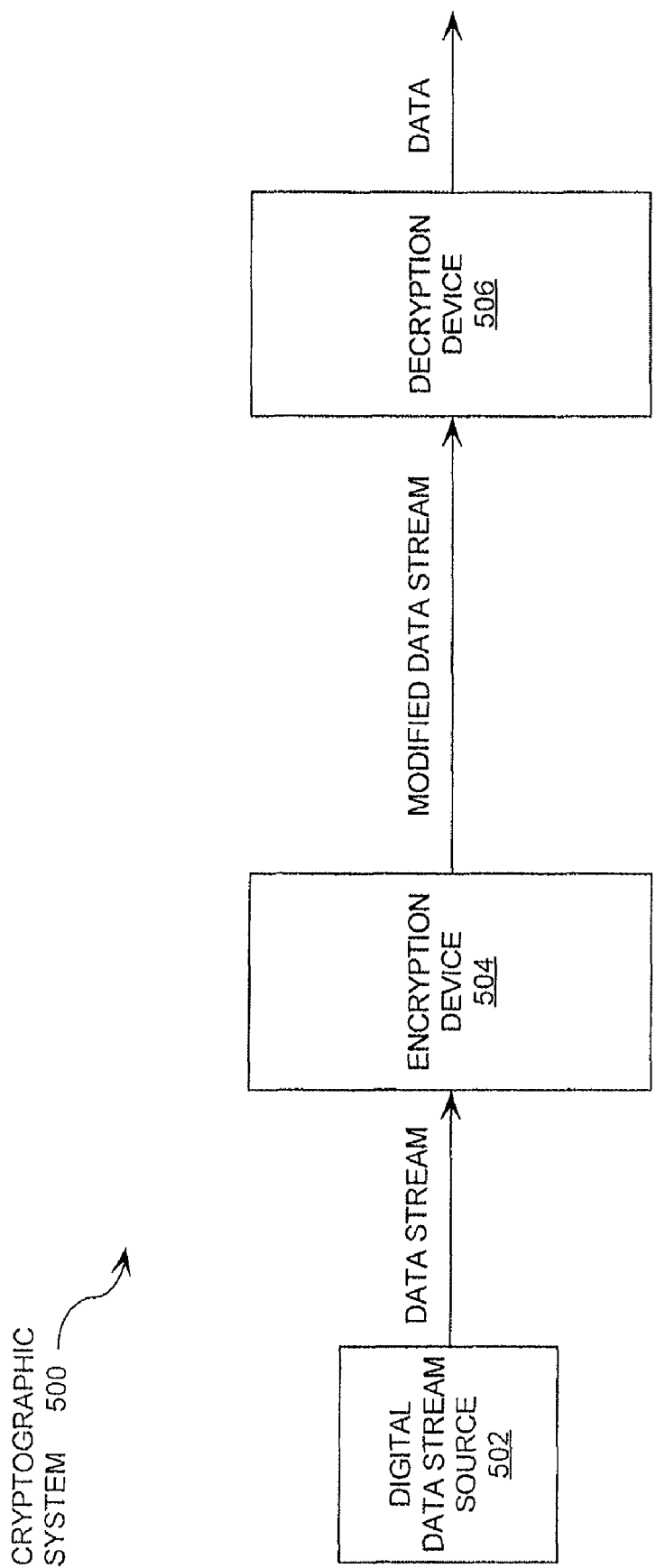
FIG. 5 is a block diagram of a cryptographic system that is useful for understanding the invention.

Referring now to FIG. 5, there is illustrated one embodiment of a cryptographic system 500 which could be used to implement the inventive arrangements. The cryptographic system 500 is comprised of a data stream source 502, an encryption device 504 and a decryption device 506. The data stream source 502 can be comprised of hardware and/or software configured to generate a data stream. The data stream can include payload data, such as voice data, video data, user identification data, signature data and/or the like. The data stream can also be a digital data stream. The data stream source 502 is also comprised of hardware and/or software configured to communicate the data stream to the encryption device 504.

The encryption device 504 is comprised of hardware and/or software configured to generate an encryption sequence. The encryption sequence is comprised of pseudo-random numbers or pseudo-chaotic random numbers. The encryption device 504 is also comprised of hardware and/or software configured to perform actions to modify the data stream using the encryption sequence. The encryption device 504 is further comprised of hardware and/or software configured to communicate a modified data stream to the decryption device 506. The encryption device 504 will be described in greater detail below in relation to FIG. 6.

The decryption device 506 is comprised of hardware and/or software configured to generate a decryption sequence. The decryption sequence is comprised of pseudo-random numbers or pseudo-chaotic random numbers. The decryption sequence can be the same as the encryption sequence generated by the encryption device 504. The decryption device 506 is also comprised of hardware and/or software configured to perform actions to decrypt the received modified data stream. Such decryption actions are well known to persons skilled in the art, and therefore will not be described in great detail herein. The decryption device 506 is also comprised of hardware and/or software configured to communicate the decrypted data to an external device (not shown). The decryption device 504 will be described in greater detail below in relation to FIG. 7.

Figure 6:
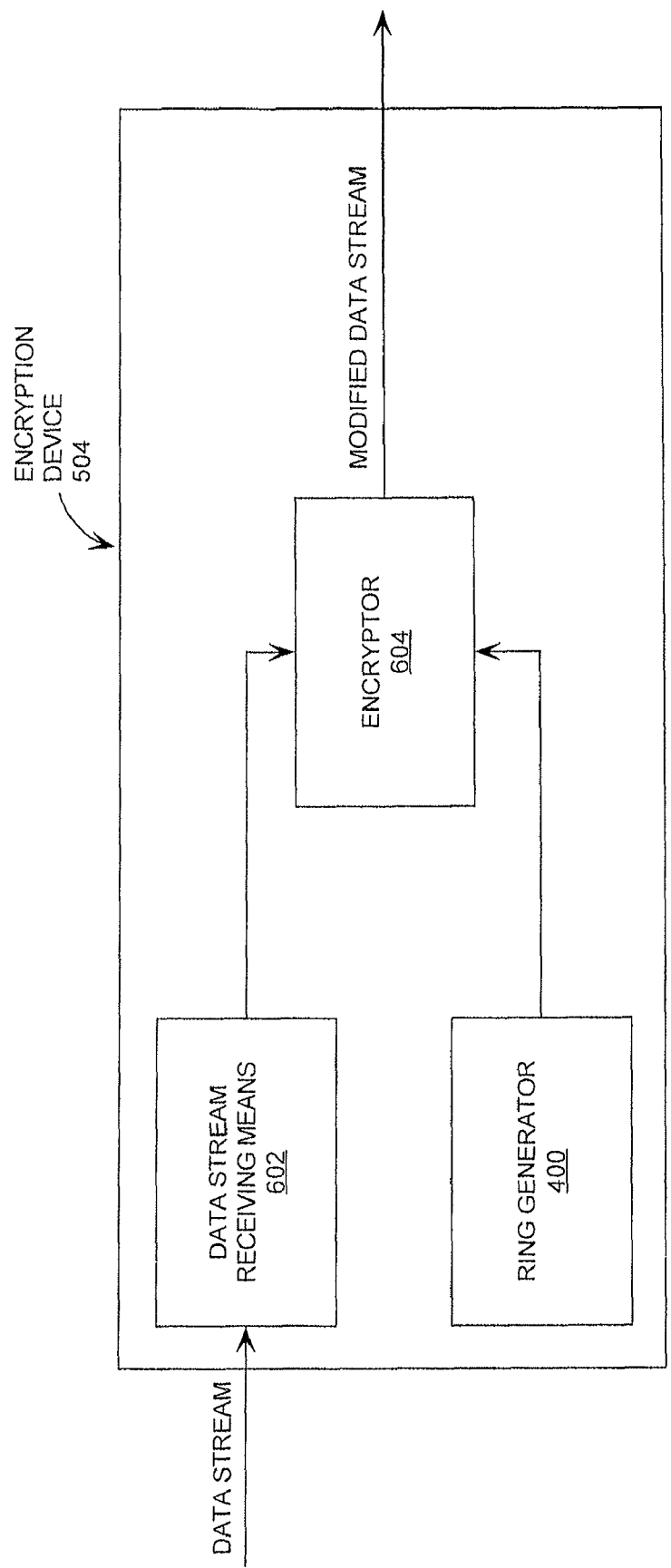
FIG. 6 is a block diagram of the encryption device of FIG. 5 that is useful for understanding the invention.

Referring now to FIG. 6, there is illustrated one embodiment of the encryption device 504 of FIG. 5. The encryption device 504 is comprised of a data stream receiving means (DSRM) 602, a ring generator 400 and an encryptor 604. Each of the listed components 602, 604 is well known to persons skilled in the art, and therefore will not be described in great detail herein. However, a brief description of the encryption device 504 is provided to assist a reader in understanding the present invention.

Referring again to FIG. 6, the DSRM 602 is comprised of hardware and/or software configured to receive a data stream from an external device, such as the data stream source 502 (described above in relation to FIG. 5). The DSRM 602 is also comprised of hardware and/or software configured to communicate the data stream to the encryptor 604. In this regard, it should be appreciated that the DSRM 602 is electronically connected to the encryptor 604.

The ring generator 400 is generally configured to generate an encryption sequence. The discussion provided above in relation to FIG. 4 is sufficient for understanding the ring generator 400 for a single random number sequence. However, it should be noted that the ring generator 400 can also be configured to permute or re-order the numbers of an encryption sequence generated therein. In this regard, a generalized permutation method may also be applied to a random number sequence internal to the ring generator 400, such that the overall ring generator output is some permuted combination of the internally generated random number sequence. The ring generator 400 is also configured to communicate the encryption sequence to the encryptor 604. In this regard, it should be appreciated that the ring generator 400 is electronically connected to the encryptor 604.

The encryptor 604 is configured to generate a modified data stream by incorporating or combining the encryption sequence with the data stream. More particularly, the encryptor 604 is configured to perform a combination method for masking the data stream. The combination method may be a standard multiplication, multiplication within a Galois extension field, addition modulo q, subtraction modulo q, bitwise logic operations or any other standard combination method. In this regard, it should be appreciated that the encryptor 604 can include a multiplier, an adder, a digital logic device, a feedback mechanism or a similar combining function device.

Figure 7:
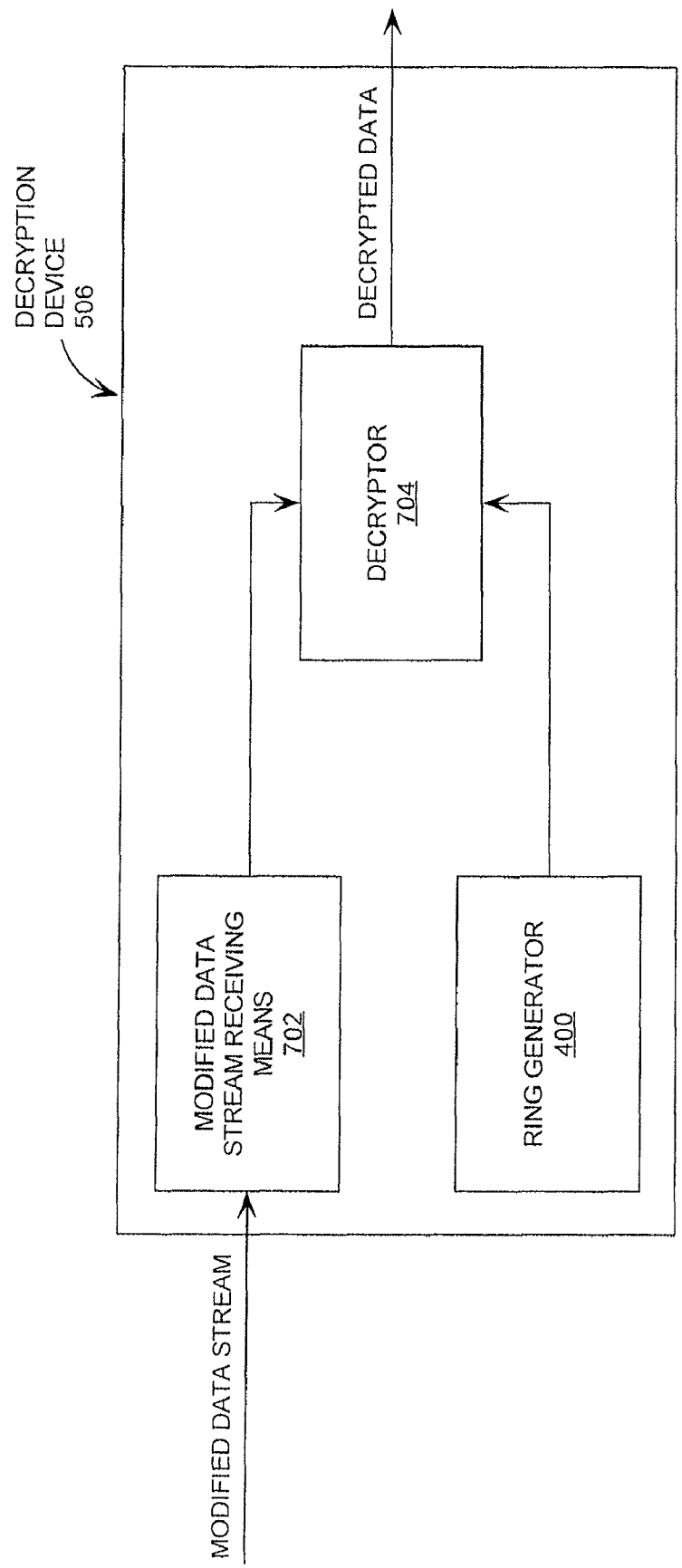
FIG. 7 is a block diagram of the decryption device of FIG. 5 that is useful for understanding the present invention.

Referring now to FIG. 7, there is illustrated one embodiment of the decryption device 506 of FIG. 5. The decryption device 506 is comprised of a modified data stream receiving means (MDSRM) 702, a ring generator 400 and a decryptor 704. Each of the listed components 702, 704 is well known to persons skilled in the art, and therefore will not be described in great detail herein. However, a brief description of the decryption device 506 is provided to assist a reader in understanding the present invention.

Referring again to FIG. 7, the MDSRM 702 is comprised of hardware and/or software configured to receive a modified data stream from an external device, such as the encryption device 504 (described above in relation to FIG. 5). The MDSRM 702 is also comprised of hardware and/or software configured to communicate the modified data stream to the decryptor 704. In this regard, it should be appreciated that the MDSRM 702 is electronically connected to the decryptor 704.

The ring generator 400 is generally configured to generate a decryption sequence. The discussion provided above in relation to FIG. 4 is sufficient for understanding the ring generator 400 for a single random number sequence. However, it should be noted that the ring generator 400 can also be configured to permute or re-order the numbers of an encryption sequence generated therein. The ring generator 400 is also configured to communicate the decryption sequence to the decryptor 704. In this regard, it should be appreciated that the ring generator 400 is electronically connected to the decryptor 704. The decryptor 704 is configured to generate decrypted data by performing a decryption method utilizing the modified data stream and the decryption sequence. Decryption methods are well known to persons skilled in the art, and therefore will not be described in great detail herein.

Notably, the ring generator 400 can also be used in a diffusion process. Diffusion processes are well known to persons skilled in the art, and therefore will not be described in great detail herein. However, it should be understood that the diffusion process is different from the encryption process performed by the cryptographic system 500 (described above in relation to FIGS. 5-7). As described above, the encryption process generally involves converting plain text into cipher text, often changing the statistical properties of the data. Plain text and cipher text are well known to persons skilled in the art, and therefore will not be described in great detail herein. The conversion is achieved by incorporating or combining an encryption sequence with a data stream. More particularly, the encryption process involves performing a standard multiplication, multiplication within a Galois extension field, addition modulo q, subtraction modulo q, bitwise logic operations or any other standard combination method. As should be understood, the encryption process is performed to: (a) increase data security; (b) ensure data integrity; and (c) ensure that each character of a digital data stream is converted from a plain text form to a cipher text form. In contrast, the diffusion process generally involves masking the properties of data by spreading the data through out a data stream or an encrypted data stream, but does not directly change the statistical properties of the atomic units. This masking is performed by: (a) re-ordering the bits in the data stream; and/or (b) shifting the bits in the data stream. As should also be understood, the diffusion process is performed to ensure that each character of a digital data stream will have the same probability of occurrence in a modified data stream (or encrypted data stream), thus maintaining chosen statistical properties of atomic data units.

Figure 8:
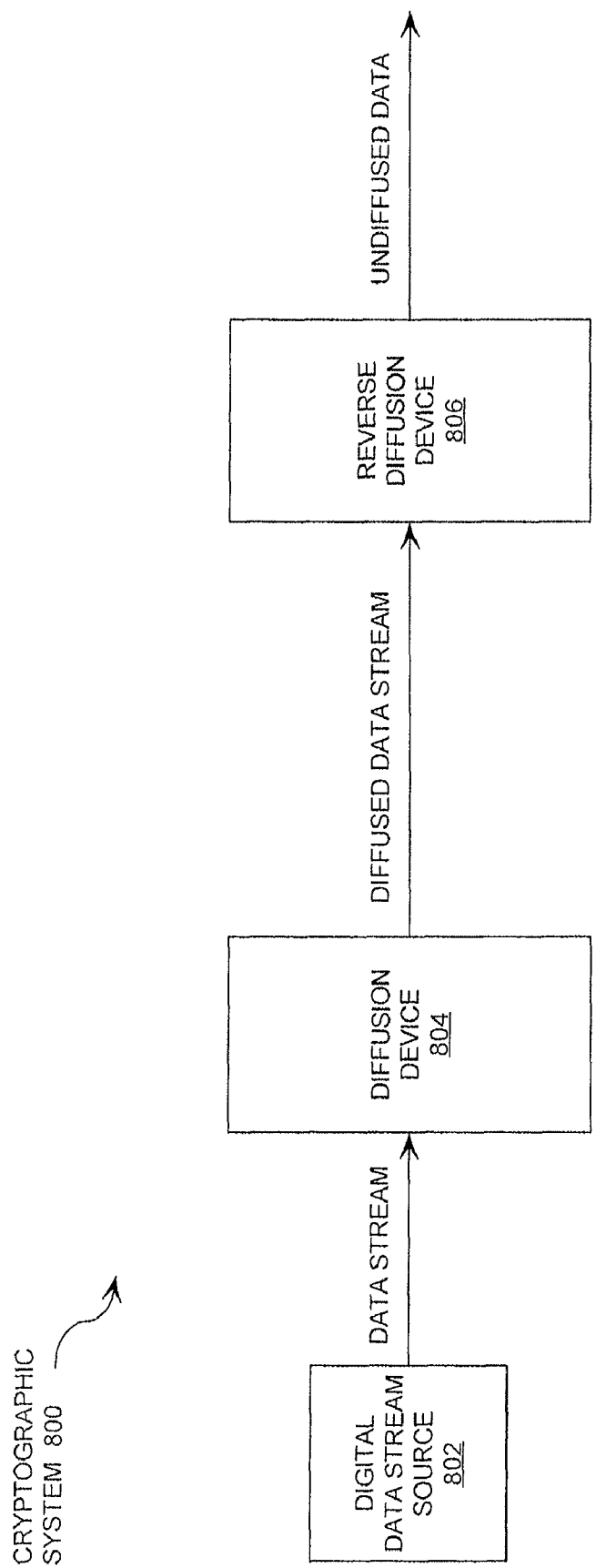
FIG. 8 is a block diagram of a cryptographic system that is useful for understanding the invention.

Referring now to FIG. 8, there is illustrated one embodiment of a cryptographic system 800 which could be used to implement the inventive arrangements. The cryptographic system 800 is comprised of a data stream source 802, a diffusion device 804 and a reverse diffusion device 806. The data stream source 802 can be comprised of hardware and/or software configured to generate a data stream. The data stream can include payload data, such as voice data, video data, user identification data, signature data and/or the like. The data stream can also be a digital data stream. The data stream source 802 is also comprised of hardware and/or software configured to communicate the data stream to the diffusion device 804.

The diffusion device 804 is comprised of hardware and/or software configured to generate a diffusion sequence. The diffusion sequence is comprised of pseudo-random numbers or pseudo-chaotic random numbers. The diffusion device 804 is also comprised of hardware and/or software configured to perform actions to permute the received data stream using the diffusion sequence. It should be noted that the diffusion operation does not change the statistical characteristics of the permuted elements. The diffusion operation also does not encapsulate any of the diffusion sequence into the output, preventing easy cryptanalysis of the diffusion sequence without knowledge of the message. Rather, the diffusion operation uses the diffusion sequence as an operator on the data. In this regard, it should be understood that the term "diffusion" refers to methods implementing algorithms for obscuring logical data patterns, increasing the apparent entropy, of an input data stream. Such algorithms are found in, but are not limited to, data encryption standard (DES) algorithms and advanced encryption standard (AES) algorithms. As should be understood, DES methods generally involve performing a re-ordering of bits in the data stream to provide diffusion. AES methods generally involve performing row-shifting and column-mixing steps to provide diffusion. As should also be understood, diffusion is performed to ensure that each character of a digital data stream will have the same probability of occurrence in a modified (or diffused) data stream. In many cases, multiple rounds of diffusion operators are applied to more fully diffuse the data. In effect, reverse engineering of mathematical patterns present in a modified (or encrypted) data stream is made more difficult.

Referring again to FIG. 8, the diffusion device 804 is further comprised of hardware and/or software configured to communicate the diffused data stream to the reverse diffusion device 806. The diffusion device 804 will be described in greater detail below in relation to FIG. 9.

The reverse diffusion device 806 is comprised of hardware and/or software configured to generate a reverse diffusion sequence. The reverse diffusion sequence is comprised of pseudo-random numbers or pseudo-chaotic random numbers. The reverse diffusion sequence can be the same as the diffusion sequence generated by the diffusion device 804. The reverse diffusion device 806 is also comprised of hardware and/or software configured to perform actions to un-diffuse the received diffused data stream. Such reverse diffusions actions are well known to persons skilled in the art, and therefore will not be described in great detail herein. The reverse diffusion device 806 is also comprised of hardware and/or software configured to communicate the undiffused data stream to an external device (not shown).

Figure 9:
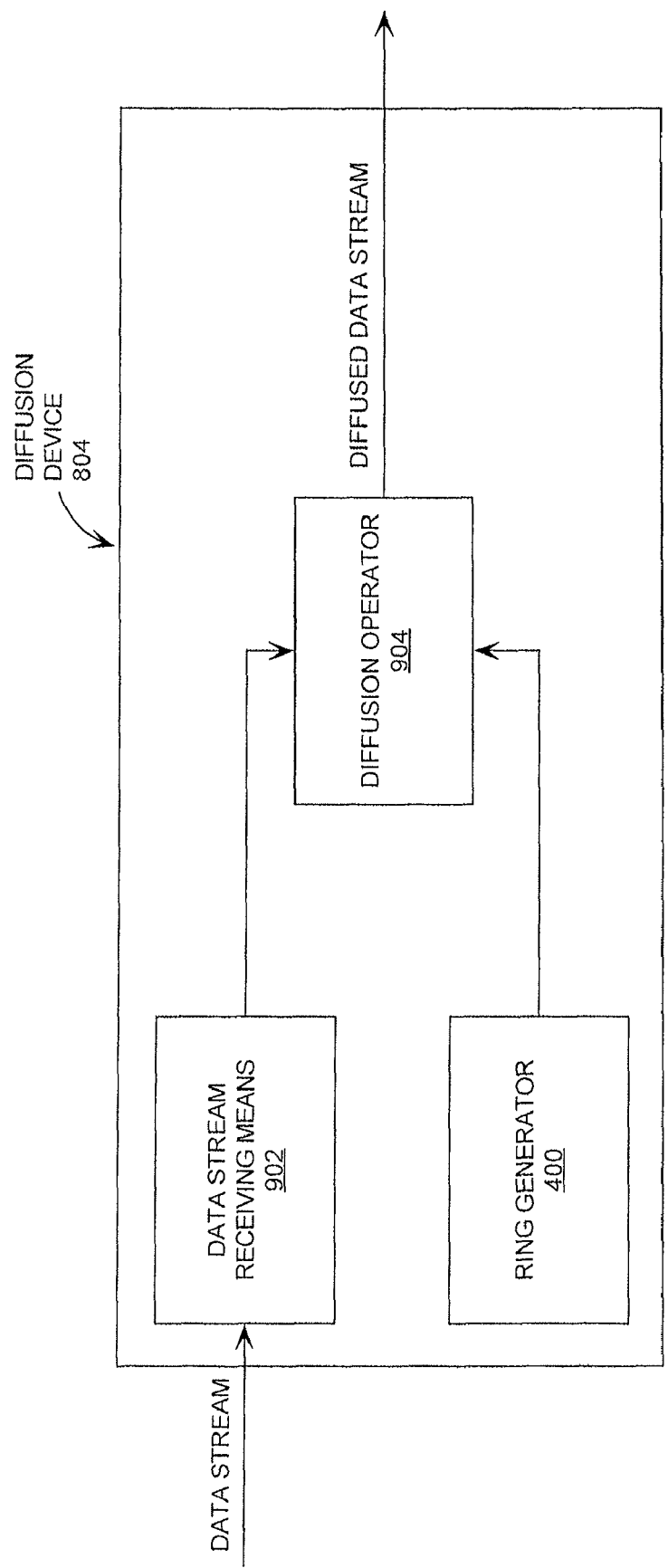
FIG. 9 is a block diagram of the diffusion device of FIG. 8 that is useful for understanding the invention.

Referring now to FIG. 9, there is illustrated one embodiment of the diffusion device 804 of FIG. 8. The diffusion device 804 is comprised of a data stream receiving means (DSRM) 902, a ring generator 400 and a diffusion operator 904. Each of the listed components 902, 904 is well known to persons skilled in the art, and therefore will not be described in great detail herein. However, a brief description of the diffusion device 804 is provided to assist a reader in understanding the present invention.

Referring again to FIG. 9, the DSRM 902 is comprised of hardware and/or software configured to receive a data stream from an external device, such as the data stream source 802 (described above in relation to FIG. 8). The DSRM 902 is also comprised of hardware and/or software configured to communicate the data stream to the diffusion operator 904. In this regard, it should be appreciated that the DSRM 902 is electronically connected to the diffusion operator 904.

The ring generator 400 is generally configured to generate a diffusion sequence. The diffusion sequence may take the form of any random number sequence modified for controlled statistical properties. The discussion provided above in relation to FIG. 4 is sufficient for understanding the ring generator 400. The ring generator 400 is also configured to communicate the diffusion sequence to the diffusion operator 904. In this regard, it should be appreciated that the ring generator 400 is electronically connected to the diffusion operator 904. The diffusion operator 904 is configured to generate a diffused data stream by performing a diffusion operation utilizing the data stream and diffusion sequence. Diffusion operations are well known to persons skilled in the art, and therefore will not be described in great detail herein.

Figure 10:
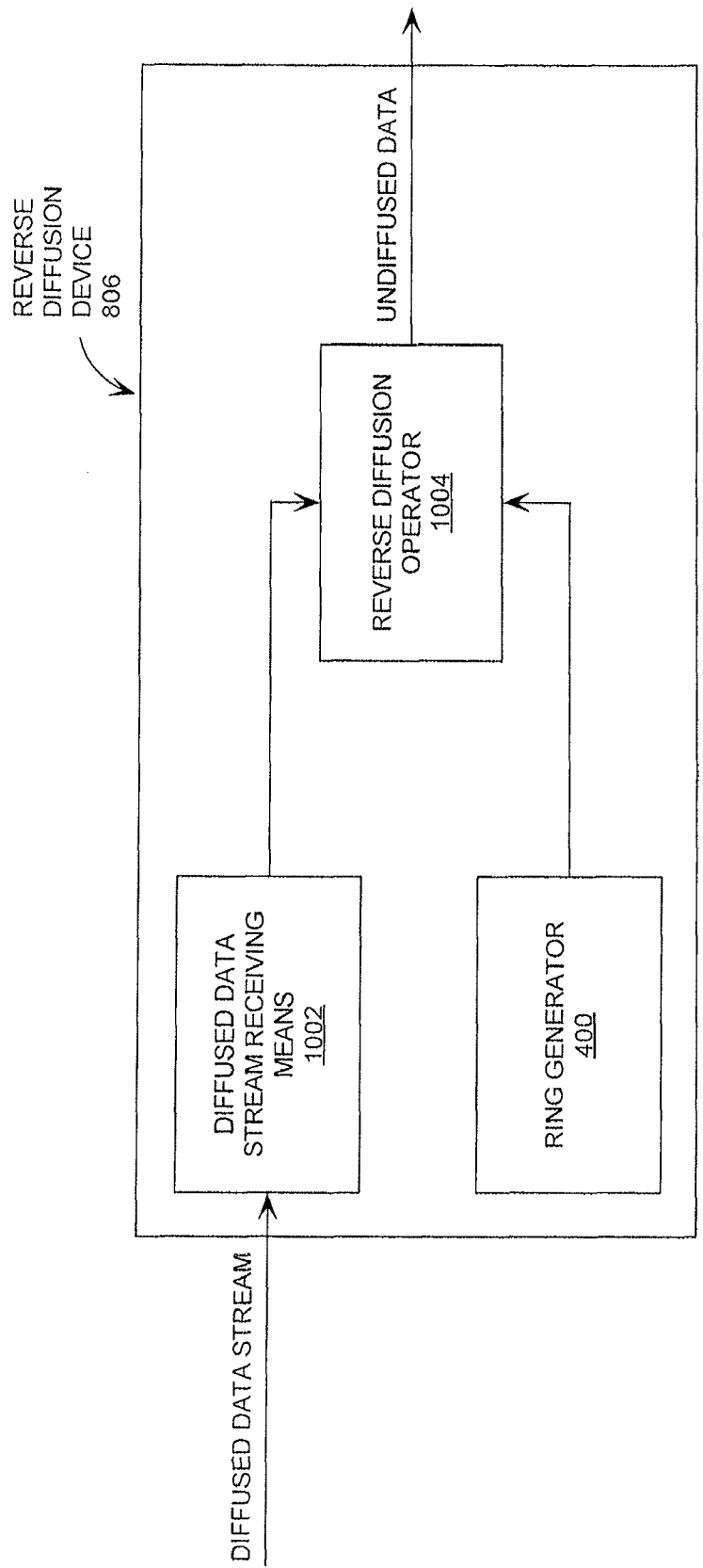
FIG. 10 is a block diagram of the reverse diffusion device of FIG. 8 that is useful for understanding the present invention.

Referring now to FIG. 10, there is illustrated one embodiment of the reverse diffusion device 806 of FIG. 8. The reverse diffusion device 806 is comprised of a diffused data stream receiving means (DDSRM) 1002, a ring generator 400 and a reverse diffusion operator 1004. Each of the listed components 1002, 1004 is well known to persons skilled in the art, and therefore will not be described in great detail herein. However, a brief description of the reverse diffusion device 806 is provided to assist a reader in understanding the present invention.

Referring again to FIG. 10, the DDSRM 1002 is comprised of hardware and/or software configured to receive a diffused data stream from an external device, such as the diffusion device 804. The DDSRM 1002 is also comprised of hardware and/or software configured to communicate the diffused data stream to the reverse diffusion operator 1004. In this regard, it should be appreciated that the DDSRM 1002 is electronically connected to the reverse diffusion operator 1004.

The ring generator 400 is generally configured to generate a reverse diffusion sequence. The diffusion sequence may take the form of any random number sequence modified for controlled statistical properties. The discussion provided above in relation to FIG. 4 is sufficient for understanding the ring generator 400. The ring generator 400 is also configured to communicate the reverse diffusion sequence to the decryptor 704. In this regard, it should be appreciated that the ring generator 400 is electronically connected to the reverse diffusion operator 1004. The reverse diffusion operator 1004 is configured to generate an undiffused data stream by performing a reverse diffusion operation utilizing the diffused data stream and the reverse diffusion sequence. Reverse diffusion operations are well known to persons skilled in the art, and therefore will not be described in great detail herein.

In light of the foregoing description of the invention, it should be recognized that the present invention can be realized in hardware, software, or a combination of hardware and software. A method of generating an arbitrary permutation ordering of digits according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

I claim:

1. A cryptographic system, comprising:
    a data stream receiving circuit configured to receive a data stream;
    a ring generator circuit including
        (a) a computing module configured to
            perform a plurality of RNS arithmetic operations to express a random number in a random number sequence as a plurality of RNS residue values, said plurality of RNS residue values computed during said plurality of RNS arithmetic operations using a plurality of different modulus raised to different powers, and convert each of said plurality of RNS residue values to a relatively prime number system so that each of said plurality of RNS residue values includes at least one digit, and (b) a permutation module coupled to said computing module and configured to generate an arbitrary permutation ordering of a plurality of output sequence numbers using a select combination of digits associated with each of said plurality of RNS residue values, wherein said arbitrary permutation ordering is determined using a cyclic structure having n elements each having assigned thereto an output sequence number of said plurality of output sequence numbers and using a value of said select combination of digits to select an available unselected element in said cyclic structure, and wherein said arbitrary permutation ordering of said plurality of output sequence numbers is defined by an order of a selection of said n elements of said cyclic structure; and an encryptor circuit coupled to said data stream receiving circuit and said ring generator circuit, said encryptor circuit configured to generate a modified data stream by incorporating or combining said plurality of output sequence numbers with said data stream.

2. The cryptographic system according to claim 1, wherein said random number has a value within a range of zero to n!−1.

3. The cryptographic system according to claim 1, wherein said computing module is further configured to calculate said plurality of RNS residue values using relatively prime numbers as moduli, wherein said relatively prime numbers are selected to have a product equal to a decimal number defined by n!.

4. The cryptographic system according to claim 1, wherein said converting module is further configured to convert each of said plurality of RNS residue values to a different relatively prime number system.

5. The cryptographic system according to claim 1, wherein said select combination of digits are chosen so that a range of values which can be determined by said digits is equal to a number of available unselected elements in said cyclic structure.

6. The cryptographic system according to claim 1, wherein said permutation module is further configured to use a Chinese Remainder Theorem to combine at least two digits associated with at least two RNS residue values to obtain a digit having a different number base than said at least two digits.

7. The cryptographic system according to claim 1, wherein said permutation module is further configured to use a Chinese Remainder Theorem to combine with one or more additional cyclic ring generators.

8. The cryptographic system according to claim 7, wherein said permutation module is further configured to use said digit having a different number base to select said available unselected element in said cyclic structure.

9. The cryptographic system according to claim 1, wherein said encryptor circuit includes at least one of a multiplier, an adder, a digital logic device and a feedback mechanism.

10. The cryptographic system according to claim 1, wherein said encryptor circuit is configured to perform at least one of a standard multiplication operation, a multiplication in a Galois extension field operation, an addition modulo q operation, a subtraction modulo q operation and a bitwise logic operation.

11. The cryptographic system according to claim 1, further comprising a second ring generator circuit configured to generate a decryption sequence.

12. The cryptographic system according to claim 11, further comprising a decryptor circuit electronically connected to said second ring generator circuit, said decryptor circuit configured to generate decrypted data by performing a decryption method utilizing said modified data stream and said decryption sequence.

13. A cryptographic system, comprising:

a data stream receiving circuit configured to receive a data stream;

a first ring generator circuit including (a) a computing module configured to perform a plurality of RNS arithmetic operations to express a random number in a random number sequence as a plurality of RNS residue values, said plurality of RNS residue values computed during said plurality of RNS arithmetic operations using a plurality of different modulus raised to different powers, and convert each of said plurality of RNS residue values to a relatively prime number system so that each of said plurality of RNS residue values includes at least one digit, and (b) a permutation module configured to generate an arbitrary permutation ordering of a plurality of output sequence numbers using a select combination of digits associated with each of said plurality of RNS residue values, wherein said arbitrary permutation ordering is determined using a cyclic structure having n elements each having assigned thereto an output sequence number of said plurality of output sequence numbers and using a value of said select combination of digits to select an available unselected element in said cyclic structure, and wherein said arbitrary permutation ordering of said plurality of output sequence numbers is defined by an order of a selection of said n elements of said cyclic structure; and a diffusion operator circuit coupled to said data stream receiving circuit and said first ring generator circuit, said diffusion operator circuit configured to generate a diffused data stream by permuting said data stream using said arbitrary permutation ordering of a plurality of output sequence numbers.

14. The cryptographic system according to claim 13, wherein said random number has a value within a range of zero to n!−1.

15. The cryptographic system according to claim 13, wherein said computing module is further configured to calculate said plurality of RNS residue values using relatively prime numbers as moduli, wherein said relatively prime numbers are selected to have a product equal to a decimal number defined by n!.

16. The cryptographic system according to claim 13, wherein said converting module is further configured to convert each of said plurality of RNS residue values to a different relatively prime number system.

17. The cryptographic system according to claim 13, wherein said select combination of digits are chosen so that a range of values which can be determined by said digits is equal to a number of available unselected elements in said cyclic structure.

18. The cryptographic system according to claim 13, wherein said permutation module is further configured to use a Chinese Remainder Theorem to combine at least two digits associated with at least two RNS residue values to obtain a digit having a different number base than said at least two digits.

19. The cryptographic system according to claim 18, wherein said permutation module is further configured to use said digit having a different number base to select said available unselected element in said cyclic structure.

20. The cryptographic system according to claim 13, further comprising a second ring generator circuit configured to generate a reverse diffusion sequence comprised of pseudo-random numbers or pseudo-chaotic random numbers.

21. The cryptographic system according to claim 20, further comprising a reverse diffusion operator circuit coupled to said second ring generator circuit, said diffusion operator circuit configured to undiffused said diffused data stream by performing reverse diffusion operations utilizing said reverse diffusion sequence.

22. A method for generating a modified data stream, comprising:
  receiving a data stream by an electronic circuit;
  performing, by said electronic circuit, a plurality of RNS arithmetic operations to express a random number in a random number sequence as a plurality of RNS residue values, said plurality of RNS residue values computed during said plurality of RNS arithmetic operations using a plurality of different modulus raised to different powers;
  converting, by said electronic circuit, each of said plurality of RNS residue values to a relatively prime number system so that each of said plurality of RNS residue values includes at least one digit;
  generating, by said electronic circuit, an arbitrary permutation ordering of a plurality of output sequence numbers using a select combination of digits associated with each of said plurality of RNS residue values; and
  generating, by said electronic circuit, said modified data stream by incorporating or combining said plurality of output sequence numbers with said data stream;
  wherein said arbitrary permutation ordering is determined using a cyclic structure having n elements each having assigned thereto an output sequence number of said plurality of output sequence numbers and using a value of said select combination of digits to select an available unselected element in said cyclic structure; and
  wherein said arbitrary permutation ordering of said plurality of output sequence numbers is defined by an order of a selection of said n elements of said cyclic structure.

23. A method for generating a diffused data stream, comprising:
  receiving, by an electronic circuit, a data stream;
  performing, by said electronic circuit, a plurality of RNS arithmetic operations to express a random number in a random number sequence as a plurality of RNS residue values, said plurality of RNS residue values computed during said plurality of RNS arithmetic operations using a plurality of different modulus raised to different powers;
  converting, by said electronic circuit, each of said plurality of RNS residue values to a relatively prime number system so that each of said plurality of RNS residue values includes at least one digit;
  generating, by said electronic circuit, an arbitrary permutation ordering of a plurality of output sequence numbers using a select combination of digits associated with each of said plurality of RNS residue values; and
  generating, by said electronic circuit, said diffused data stream by permuting said data stream using said arbitrary permutation ordering of a plurality of output sequence numbers;
  wherein said arbitrary permutation ordering is determined using a cyclic structure having n elements each having assigned thereto an output sequence number of said plurality of output sequence numbers and using a value of said select combination of digits to select an available unselected element in said cyclic structure; and
  wherein said arbitrary permutation ordering of said plurality of output sequence numbers is defined by an order of a selection of said n elements of said cyclic structure.

* * * * *